United States Patent

Hayashi et al.

Patent Number: 5,507,080
Date of Patent: Apr. 16, 1996

[54] METHOD OF MANUFACTURING A CAPACITANCE SENSOR

[75] Inventors: Shigenori Hayashi, Gose; Takeshi Kamada, Nara; Hideo Torii, Higashiosaka; Takashi Hirao, Moriguchi, all of Japan

[73] Assignee: Matsushita Electric Industrial Co., Ltd., Osaka, Japan

[21] Appl. No.: 353,315

[22] Filed: Dec. 5, 1994

[30] Foreign Application Priority Data

Dec. 7, 1993 [JP] Japan ................... 5-306184
Dec. 7, 1993 [JP] Japan ................... 5-306185

[51] Int. Cl.⁶ .......................................... H01G 5/16
[52] U.S. Cl. .................... 29/25.41; 73/514.32; 73/724; 361/283.4
[58] Field of Search ................... 29/25.41, 424; 361/283.4, 283.3; 73/718, 724, 514.32

[56] References Cited

U.S. PATENT DOCUMENTS

| | | |
|---|---|---|
| 4,530,029 | 7/1985 | Beristain . |
| 4,823,230 | 4/1989 | Tiemann . |
| 5,134,886 | 8/1992 | Ball . |
| 5,211,058 | 5/1993 | Fukiura et al. ............... 29/25.41 X |

FOREIGN PATENT DOCUMENTS

| | | |
|---|---|---|
| 2610406 | 8/1988 | France . |
| 62-162369 | 7/1987 | Japan . |
| 5-283756 | 10/1993 | Japan . |

OTHER PUBLICATIONS

S. Y. Lee; "Variable Capacitance Signal Transduction and the Comparison with other Transduction Schemes", Process Instrumentation, vol. 1, No. 3, Jun. 1972, pp. 138–143.
Patent Abstracts of Japan, vol. 15, No. 311 (Aug. 8, 1991).

*Primary Examiner*—Carl E. Hall
*Attorney, Agent, or Firm*—Fish & Richardson

[57] ABSTRACT

A small and highly sensitive capacitance type pressure sensor is obtained by filling an alkali halide material such as KBr into a through-hole, forming a conductive thin film on the surface, and dissolving and removing the alkali halide material. An insulating plate disposed with a through-hole in the thickness direction is filled with a molten alkali halide material such as KBr. After forming a conductive thin film on the surface of the alkali halide material filled into the through-hole and the vicinity thereof, the alkali halide material is dissolved by water and removed. In this way, a diaphragm is made of the through-hole and the conductive thin film. A curve of the diaphragm caused by a pressure difference between the both faces of the conductive thin film is detected as a capacitance change between the conductive thin film and the electrode layer.

8 Claims, 4 Drawing Sheets

METHOD OF MANUFACTURING A CAPACITANCE SENSOR

FIELD OF THE INVENTION

This invention relates to a capacitance type sensor which is useful as a pressure sensor or as an acceleration sensor by using a thin film diaphragm. This invention further relates to a method of manufacturing this capacitance type sensor. In particular, this invention relates to a capacitance type sensor which does not require chemical etching and a method of manufacturing the same.

BACKGROUND OF THE INVENTION

Recently, pressure sensors are in wide use, varying from industrial plants to domestic electrical appliances. In particular, since a semiconductor pressure sensor utilizes both excellent mechanical characteristics of silicon and high productivity of semiconductor manufacturing techniques, it has become an indispensable component when used in combination with a microcomputer, for automatic control system which is moving towards intelligence and high efficiency. Generally, a semiconductor pressure sensor can be classified into a piezoresistance type and a capacitance type. The piezoresistance type pressure sensor uses a piezoresistance effect of silicon, and applies a method of detecting a diaphragm curve as a change of resistance amount in diffusion resistance. This sensor is produced in the usual semiconductor manufacturing process. On the other hand, the capacitance type pressure sensor applies a system of picking out a capacitance change between a fixed electrode and a diaphragm as an electric signal, and this type of sensor has high sensitivity and good temperature characteristics.

Also recently, along with the demand for improvements in controlling stability and safety in the field of automobiles, suspension brake systems and air bag systems have gradually come into wide use. Therefore, there is a great demand for an acceleration sensor, and the development of a semiconductor curved gage type acceleration sensor or a capacitance type acceleration sensor which is small, light, and highly reliable has been promoted. Furthermore, also in the fields of magnetic disks and light disks, there is a demand for a small, light, and highly reliable acceleration sensor for the purpose of controlling pick-up and access.

Generally, a capacitance type pressure sensor is superior to a piezoresistance type pressure sensor in resolution. Therefore, when the piezoresistance type pressure sensor is used to conduct a micropressure measurement with the same resolution as that of the capacitance type pressure sensor, a diaphragm must be formed even thinner than a conventional one. However, it is difficult to form a thin diaphragm by etching silicon chemically with semiconductor manufacturing techniques. Even if the thin diaphragm were formed, it must be handled with care and is easy to break. As a result, it was actually impossible to manufacture a piezoresistance type pressure sensor having the equivalent resolution as that of the capacitance type pressure sensor. Therefore, the capacitance type pressure sensor is considered to be suitable for measurement in a micropressure area of 100 gf/cm$^2$ or less. However, also in this case, it was necessary to apply micromachining techniques to form the diaphragm. This was a problem, since these processing techniques were complicated and extremely costly. On the other hand, the capacitance type pressure sensor using a stainless diaphragm has been sold on the market, but this sensor has a defect of being easily affected by disturbance such as parasitic capacity. Thus, in order to achieve high accuracy, the problems existed that the sensor tends to become larger and more expensive.

In general, an acceleration sensor is known in the form of a semiconductor system of the piezoresistance type and capacitance type, and also in the form of a piezoelectric system using a piezoelectric substance. However, regardless of which system is used, a compact size and high sensitivity of the acceleration sensor can be attained only by the use of advanced mechanical characteristics of sensing parts, such as diaphragm, cantilever etc. In order to form the diaphragm and cantilever, highly fine processing techniques, for example micromachining techniques, are required. This was a problem, since these processing techniques lead to highly advanced or extremely costly techniques. As a matter of fact, the manufacturing cost does not pay at present, so that these techniques have not been put into practical use.

SUMMARY OF THE INVENTION

It is an object of this invention to solve the above-noted problems in the conventional system by providing a small and highly accurate capacitance type sensor which does not require chemical etching, uses a thin conductive thin film, and is useful for a capacitance type pressure sensor, a capacitance type acceleration sensor etc. Another object of this invention is to provide a method of manufacturing this capacitance type sensor.

In order to accomplish these and other objects and advantages, a capacitance type sensor of a first embodiment of this invention comprises an insulating plate having a through-hole in the thickness direction, a conductive thin film disposed on a surface of the insulating plate covering the through-hole, an electrode layer disposed on the other surface of the insulating plate covering at least the through-hole, and a base material which holds the insulating plate together with the electrode layer.

It is preferable that the conductive thin film has a thickness of 10 nm or more and 5 µm or less.

Furthermore, it is preferable that the electrode layer is formed on the surface of the base material, and that the electrode layer is adhered mechanically to the other side of the insulating plate.

In addition, it is preferable that the electrode layer is formed on the surface of the base material, and that the electrode layer is adhered to the other side of the insulating plate by an adhesive.

It is also preferable that the capacitance type sensor comprises a capacitance type pressure sensor.

It is preferable that the capacitance type sensor comprises a capacitance type acceleration sensor formed by disposing a dead weight on the conductive thin film on the opposite side to the through-hole.

A second embodiment of this invention is a method of manufacturing a capacitance type sensor comprising an insulating plate having a through-hole in the thickness direction, a conductive thin film disposed on a surface of the insulating plate covering the through-hole, an electrode layer disposed on the other surface of the insulating plate covering at least the through-hole, and a base material which holds the insulating plate together with the electrode layer, and comprising the steps of: holding one side of an insulating plate having a through-hole in the thickness direction by means of a holding board having a predetermined flatness, filling the through-hole from the other side of the insulating plate with a molten alkali halide material and cooling the alkali halide material and smoothing the surface of the alkali halide material filled into the through-hole on the side held by the holding board, removing the insulating plate from the holding board and depositing a conductive thin film to cover the alkali halide material filled into the through-hole and also to cover the vicinity thereof, dissolving and removing the alkali halide material by washing in water, and bonding the other side of the insulating plate to a base material disposed with a conductive surface which serves as a counter electrode.

It is preferable that the alkali halide material is a rock-salt crystal composed of at least one alkali metal element selected from the group consisting of Na, K, and Cs, and at least one halogen element selected from the group consisting of F, Cl, Br, and I.

Additionally, it is preferable that the alkali halide material is at least one salt selected from the group consisting of NaF, NaCl, KCl, KBr, CsBr, KI, and CsI.

Furthermore, it is preferable that the conductive thin film has a thickness of 10 nm or more and 5 μm or less.

It is also preferable that the electrode layer is formed on the surface of the base material, and that the electrode layer is adhered mechanically to the other side of the insulating plate.

In addition, it is preferable that the electrode layer is formed on the surface of the base material, and that the electrode layer is adhered to the other side of the insulating plate by an adhesive.

It is preferable that the capacitance type sensor comprises a capacitance type pressure sensor.

Furthermore, it is preferable that the capacitance type sensor comprises a capacitance type acceleration sensor formed by disposing a dead weight on the conductive thin film on the opposite side to the through-hole.

As mentioned above, a capacitance type sensor of this invention comprises an insulating plate having a through-hole in the thickness direction, a conductive thin film disposed on a surface of the insulating plate covering the through-hole, an electrode layer disposed on the other surface of the insulating plate covering at least the through-hole, and a base material which holds the insulating plate together with the electrode layer. As a result, a small and highly accurate capacitance type sensor can be attained which does not require chemical etching, uses a thin conductive thin film, and is useful for a capacitance type pressure sensor, a capacitance type acceleration sensor etc.

In the embodiment of a capacitance type pressure sensor, a thin film diaphragm part is comprised of a through-hole disposed in an insulating plate and a conductive thin film disposed on a surface side of the insulating plate. Furthermore, the through-hole, the conductive thin film, and an electrode layer form a capacitance part. When a gap appears between the internal pressure of the capacitance part and an external pressure of the diaphragm part, the conductive thin film is curved or distorted, and the distance with the electrode part changes, thereby changing capacitance in the capacitance part. By detecting this capacitance change in the capacitance part, the external pressure can be measured based on the internal pressure of the capacitance part. Furthermore, when the conductive thin film is determined to have a thickness of 10 nm or more and 5 μm or less, a micropressure can be measured with high resolution.

In the embodiment of a capacitance type acceleration sensor, the capacitance type acceleration sensor is formed by disposing a dead weight on the conductive thin film on the opposite side to the through-hole. In this way, a thin film diaphragm part is comprised of a through-hole disposed in an insulating plate and a conductive thin film disposed on a surface of the insulating plate. Furthermore, the through-hole, the conductive thin film, and an electrode layer form a capacitance part. When the whole acceleration sensor is accelerated, the dead weight tries to remain in the original position according to the law of inertia. As a result, due to the relative microdisplacement of the dead weight, the conductive thin film comprising the diaphragm part is curved or distorted. This causes a distance with the electrode layer to change, and capacitance in the capacitance part changes as well. By detecting this change of capacitance in the capacitance part, the power working on the dead weight can be measured. Based on the measured power, the acceleration is operated in a conventional method.

According to the manufacturing method of this invention, by holding one side of an insulating plate having a through-hole by means of a holding board having a predetermined flatness, and by filling the through-hole from the other side of the insulating plate with a molten alkali halide material, the surface of the alkali halide material filled into the through-hole is smoothed on the side held by the holding board in the same degree of flatness as the holding board. In this state, the insulating plate is removed from the holding board. Next, by depositing a conductive thin film to cover the part of the alkali halide material filled into the through-hole and also to cover the vicinity of the through-hole, the conductive thin film can be formed easily at the through-hole part. Furthermore, the surface of the conductive thin film formed in this way has the same degree of flatness as the holding board. Then, when it is washed with water, the alkali halide material filled into the through-hole part is dissolved and removed. Thus, the through-hole part becomes hollow. At this time, one side of the openings of the through-hole is covered with the conductive thin film. At last, the other side of the insulating plate is bonded to a base material disposed with an electrode layer. In this way, both sides of the through-hole are covered respectively with the conductive thin film and the electrode layer, thereby forming a capacitance part (capacitor) at the through-hole part. In addition, since it is formed on the surface of the base material of the electrode layer, deformation can not occur. On the other hand, the surface of the conductive thin film is open, and accordingly, a capacitance type pressure sensor having a pressure surface on the side of the conductive thin film is completed.

As described as a preferred embodiment of the invention, when the alkali halide material is a rock-salt crystal composed of at least one alkali metal element selected from the group consisting of Na, K, and Cs, and at least one halogen element selected from the group consisting of F, Cl, Br, and I, the alkali halide material can be easily dissolved in water. The alkali halide does not remain in the through-hole part, so that it is possible to remove the alkali halide material almost completely. As a result, not only can a diaphragm having optional mechanical characteristics be attained easily and with high accuracy, but capacitance type pressure sensors produced in quantity also show only a small quality difference. The alkali halide dissolved in water can be used repeatedly by vaporizing the water. Of course, the method of this invention does not require a chemical etching process, so there is no problem with environmental contamination.

DETAILED DESCRIPTION OF THE INVENTION

This invention will be described by referring to the following illustrative examples and attached figures. The examples are not intended to limit the invention in any way.

EXAMPLE 1

Figure 1:
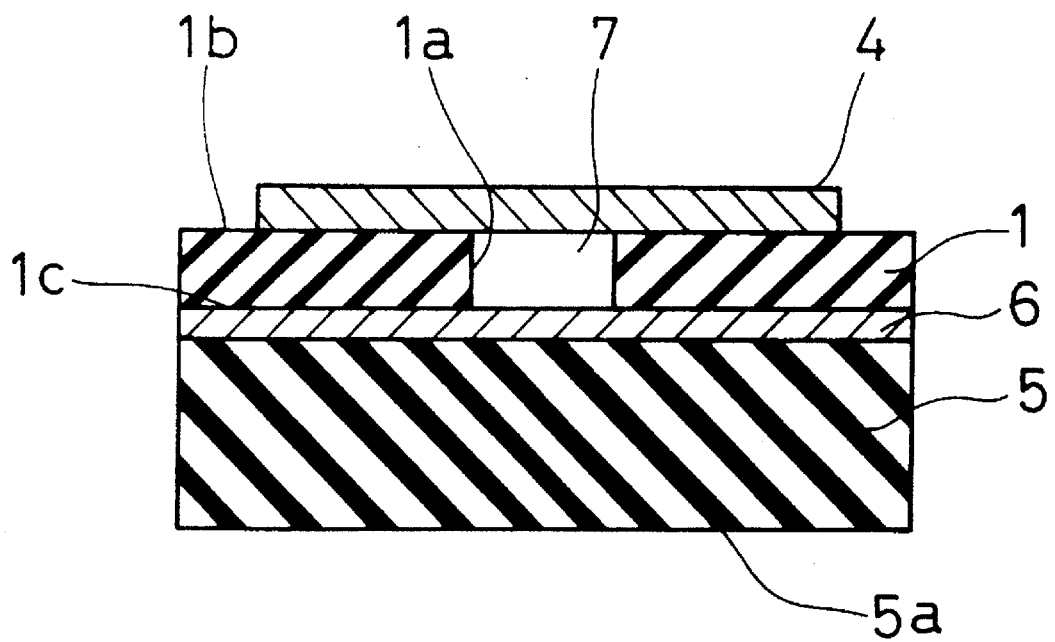
FIG. 1 is a cross-sectional view showing a capacitance type pressure sensor in an embodiment of this invention.

A capacitance type pressure sensor of this invention and a method of manufacturing the capacitance type pressure sensor will be described in a preferred embodiment by referring to FIGS. 1 and 2 (a) to (d). FIG. 1 is a cross-sectional view showing the capacitance type pressure sensor in an embodiment of this invention, and FIGS. 2 (a) to (d) are schematic views showing the method of manufacturing the capacitance type acceleration sensor in an embodiment of this invention.

In FIG. 1, the capacitance type pressure sensor of this invention comprises an insulating plate 1 having a through-hole 1a of an optional size disposed in the thickness direction, a conductive thin film 4 disposed on a surface 1b of insulating plate 1 covering an opening part of through-hole 1a and the vicinity thereof, an electrode layer 6 disposed on the other surface 1c of insulating plate 1 covering at least another opening part of through-hole 1a and the vicinity thereof, and a base material 5 which holds insulating plate 1 together with electrode layer 6. Through-hole 1a and conductive thin film 4 together comprise a thin film diaphragm. A capacitance part 7 (capacitor) is comprised of through-hole 1a, conductive thin film 4, and electrode layer 6 in which conductive thin film 4 and electrode layer 6 respectively cover the both openings of through-hole 1a. As for insulating plate 1, a sintered body of ceramics such as alumina ($Al_2O_3$), glass, mullite, cordierite, strontium titanate, magnesia (MgO), and silcon can be used. In this embodiment, alumina having a thickness of about 500 μm is used. In this instance, it is more efficient to form through-hole 1a in advance before the step of sinter-molding insulating plate 1 takes place. The thickness of conductive thin film 4 is not particularly decided and can be selected according to need. However, it is particularly preferable in this embodiment to select a thickness from a range in which a diaphragm can be formed effectively into a thin film. Therefore, the thickness should be 5 μm or less, and more preferably about 1 μm.

When there is a difference between the internal pressure of capacitance part 7 (e.g., internal pressure of through-hole 1a) and the external pressure rather than with conductive thin film 4, according to the pressure difference, conductive thin film 4 is curved at the part where through-hole 1a is covered. On the other hand, since electrode layer 6 is disposed on the surface of base material 5, deformation does not occur, and capacitance in capacitance part 7 changes. By detecting this capacitance change, the external pressure can be measured based on the internal pressure of capacitance part 7. Furthermore, when a hole having a small diameter is formed penetrating the back side 5a of base material 5 into capacitance part 7, the difference in pressure between the two areas separated by conductive thin film 4 can also be detected.

Figure 2:
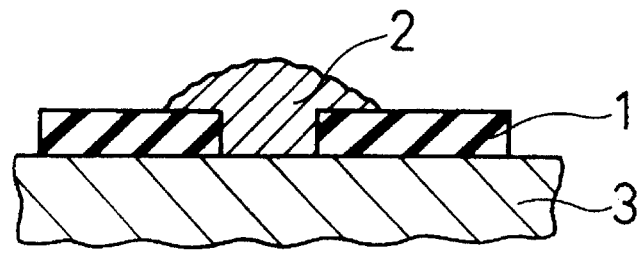
FIGS. 2 (a) to (d) are schematic views showing a method of manufacturing a capacitance type pressure sensor in an embodiment of this invention.
Figure 2:
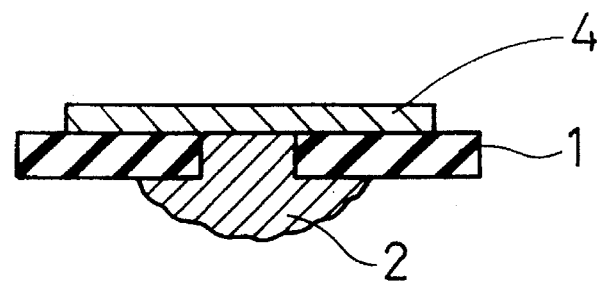
Figure 2:
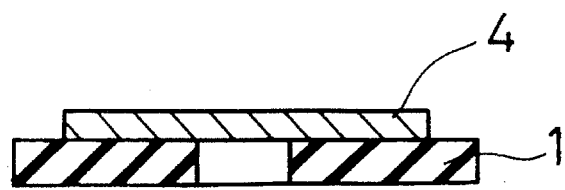
Figure 2:
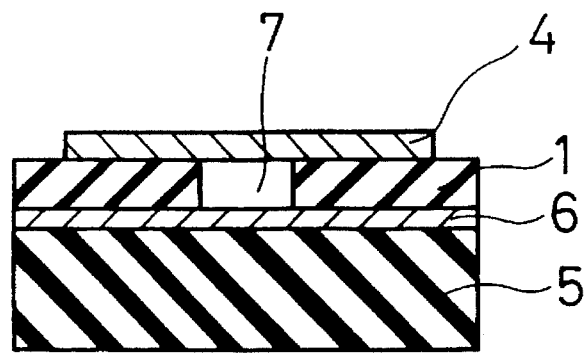

Next, FIGS. 2 (a) to (d) show the method of manufacturing the capacitance type pressure sensor described above. First, as shown in FIG. 2 (a), insulating plate 1 having through-hole 1a of an optional size is placed on top of a holding board 3 having a predetermined flatness. Here, the holding board should be made of materials which do not react with alkali halide (ceramics, metal), should have a flat surface, and should have sufficient volume and form stability so that it does not bend in the processes of heat treatment and press molding. Then, a water soluble alkali halide material 2, for example, a rock-salt crystal KBr is melted and filled once into this through-hole 1a. At this time, alkali halide material 2 is press-molded, so that alkali halide material 2 filled into through-hole 1a becomes flat on the side of holding board 3. After cooling the alkali halide material, FIG. 2 (b) shows the state in which insulating plate 1 is removed from holding board 3 (the figure shows the state after being turned over), and conductive thin film 4 is deposited on the side which was in contact with holding board 3. In other words, alkali halide material 2 filled into through-hole 1a and the vicinity part are covered with conductive thin film 4. Next, as shown in FIG. 2 (c), alkali halide material 2 is dissolved and removed by using water which is soluble to alkali halide material 2. As a result, alkali halide material 2, which was filled into through-hole 1a of insulating plate 1 is removed, and a diaphragm having hollow through-hole 1a is formed. In the last step shown in FIG. 2 (d), base material 5 disposed with electrode layer 6 is adhered mechanically to the opposite side of the diaphragm of insulating plate 1. Alternatively, they are bonded together by means of a suitable adhesive.

Here, the internal pressure of capacitance part 7 is determined by the atmospheric pressure at the step shown as FIG. 2 (d). Furthermore, although various kinds of alkali halide material 2 are available, it was confirmed in experiments that a rock-salt crystal can be handled most easily and is also suitable when it needs to be heated to form conductive thin film 4. As for alkali halide material 2 besides KBr, it is also possible to use a rock-salt crystal comprising one element selected from water soluble K, Na, and Cs, and one other element selected from Cl, F, Br, and I. Examples of this rock-salt crystal are NaF, NaCl, KCl, KBr, CsBr, Ki, and CsI. Naturally, the capacitance type pressure sensor related to this invention is not limited to the above-mentioned embodiment, but instead, the above structure serves as a basic form which can be applied in various forms and sizes.

EXAMPLE 2

Figure 3:
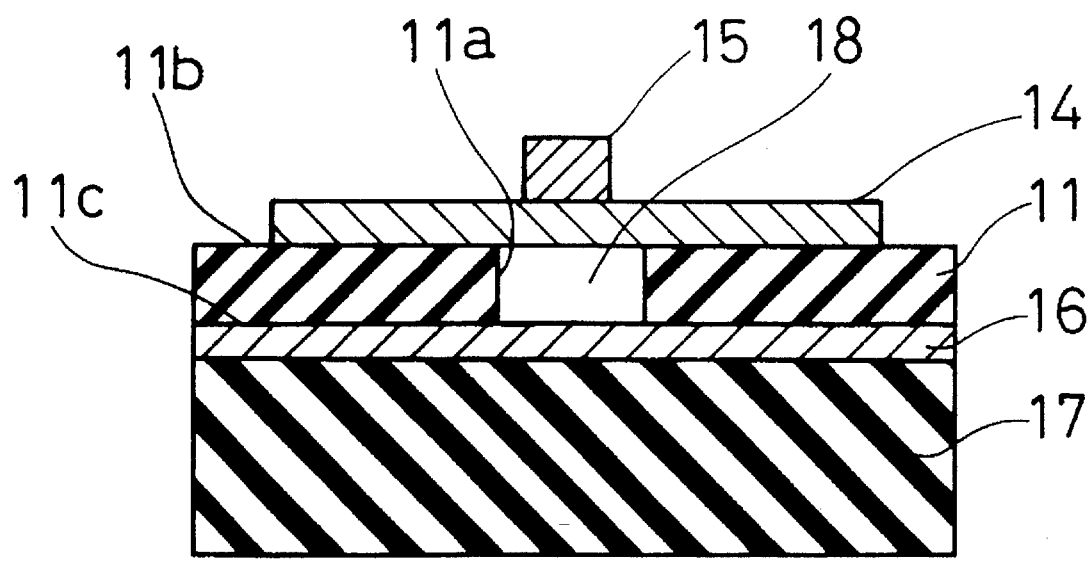
FIG. 3 is a cross-sectional view showing a capacitance type acceleration sensor in an embodiment of this invention.

A capacitance type acceleration sensor of this invention and a method of manufacturing the capacitance type acceleration sensor will be described in a preferred embodiment by referring to FIGS. 3 and 4 (a) to (e). FIG. 3 is a cross-sectional view showing the capacitance type acceleration sensor in an embodiment of this invention, and FIGS. 4 (a) to (e) are schematic views showing the method of manufacturing the capacitance type acceleration sensor in an embodiment of this invention.

In FIG. 3, the capacitance type acceleration sensor of this invention comprises an insulating plate 11 having a through-hole 11a of an optional size disposed in the thickness direction, a conductive thin film 14 disposed on a surface 11b of insulating plate 11 covering the opening part of through-hole 11a and the vicinity thereof, a dead weight 15 disposed on the surface of conductive thin film 14 on the opposite side to the through-hole, an electrode layer 16 disposed on the other surface 11c of insulating plate 11 covering at least another opening part of through-hole 11a and the vicinity thereof, and a base material 17 which holds insulating plate 11 together with electrode layer 16. Through-hole 11a and conductive thin film 14 together comprise the thin film diaphragm. The capacitance part 18 (capacitor) is comprised of through-hole 11a, conductive thin film 14, and electrode layer 16 in which which conductive thin film 14 and electrode layer 16 respectively cover both openings. As for insulating plate 11, for example, a sintered body of ceramics such as alumina ($Al_2O_3$) having a thickness of about 500 μm is used. In this instance, it is more efficient to form through-hole 11a in advance before the step of sinter-molding insulating plate 11 takes place. The thickness of conductive thin film 14 can be selected optionally. However, it is particularly preferable in this embodiment to select a thickness from a range in which a diaphragm can be formed effectively into a thin film. Therefore, the thickness should be 5 μm or less, and more preferably about 1 μm.

When an acceleration force is applied to the whole acceleration sensor, insulating plate 11 and electrode layer 16 comprising base material 17 are accelerated together with base material 17. However, dead weight 15 disposed on top of conductive thin film 14 comprising the diaphragm tries to remain in the original position according to the law of inertia. Therefore, according to the acceleration working on the acceleration sensor, dead weight 15 shows a microdisplacement, so that conductive thin film 14 disposed with dead weight 15 is curved at a part where through-hole 11a is covered. On the other hand, since electrode layer 16 is disposed on the surface of base material 17, distortion does not occur, and capacitance of capacitance part 18 changes. In other words, the acceleration working on the acceleration sensor leads to a microdisplacement of dead weight 15, and is expressed as a curve in the diaphragm, and is then detected as a capacitance change between conductive thin film 14 and electrode layer 16. By detecting this change in capacitance, power working on conductive thin film 14 and on dead weight 15 can be measured. Furthermore, based on the measured power, an acceleration working on the acceleration sensor can be operated.

Figure 4:
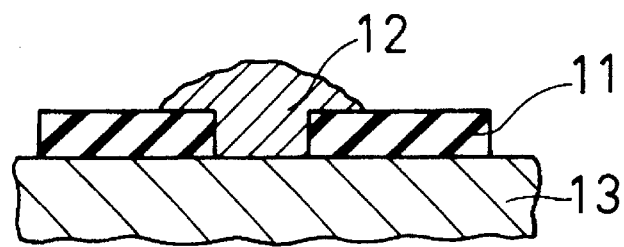
FIGS. 4 (a) to (e) are schematic views showing a method of manufacturing a capacitance type acceleration sensor in an embodiment of this invention.
Figure 4:
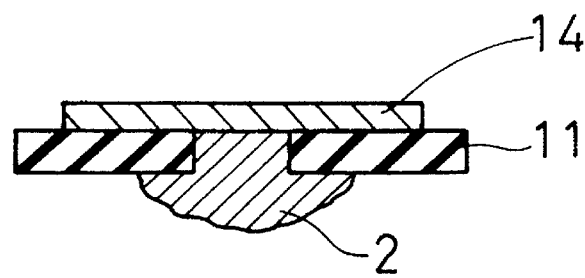
Figure 4:
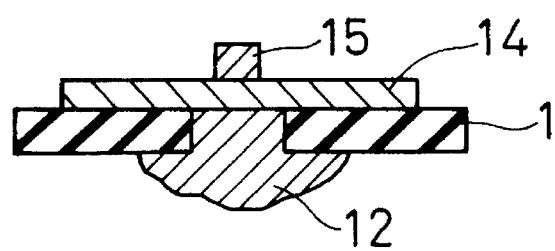
Figure 4:
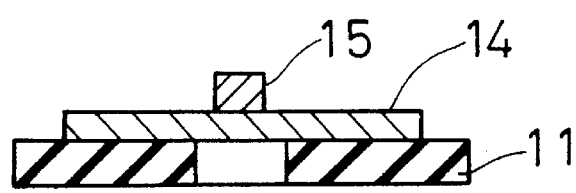
Figure 4:
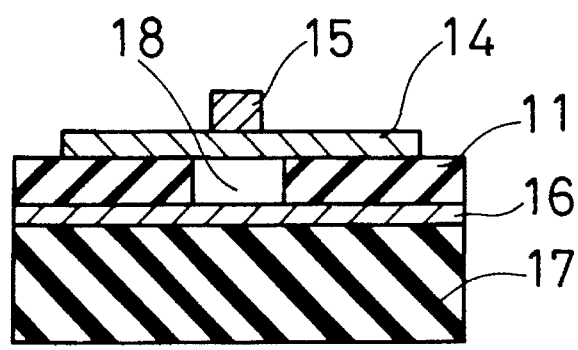

Next, FIGS. 4 (a) to (e) show the method of manufacturing the capacitance type acceleration sensor described above. First, as shown in FIG. 4 (a), insulating plate 11 having through-hole 11a of an optional size is placed on top of a holding board 13 having a predetermined flatness. Then, a water soluble alkali halide material 12, for example, a rock-salt crystal KBr is melted and filled once into this through-hole 1a. At this time, alkali halide material 12 is press-molded, so that alkali halide material 12 filled into through-hole 11a becomes flat on the side of holding board 13. After cooling the alkali halide material, FIG. 4 (b) shows the state in which insulating plate 11 is removed from holding board 13 (the figure shows the state after being turned over), and conductive thin film 14 is deposited on the side which was in contact with holding board 13. In other words, alkali halide material 12 filled into through-hole 11a and the vicinity part are covered with conductive thin film 14. Then, FIG. 4 (c) shows that conductive thin film 14 formed is deposited on the surface (on the opposite side to through-hole 11a) with a layer of dead weight 15. The layer of dead weight 15 is formed, for example, with an Al metal material by means of a vacuum evaporation method of resistance heating type into a thickness of 10 μm and an area of $8\times10^5$ μm². The size of the through-hole was 0.9 mm in diameter, and a size of the dead weight was 0.5 mm in diameter. Here, it is practical and preferable to determine the size of the through-hole to be from 0.1 mm to 1 mm in diameter.

Next, as shown in FIG. 4 (d), alkali halide material 12 is dissolved and removed by using water which is soluble to alkali halide material 12. As a result, alkali halide material 12 which was filled into through-hole 11a of insulating plate 11 is removed, and a diaphragm having hollow through-hole 11a is formed. In the last step shown in FIG. 4 (e), base material 17 disposed with electrode layer 16 is adhered mechanically to the opposite side of the diaphragm of insulating plate 11. Alternatively, they are bonded together by means of a suitable adhesive.

Here, although various kinds of alkali halide material 12 are available, it was confirmed in experiments that a rock-salt crystal can be handled most easily and is also suitable when it needs to be heated to form conductive thin film 14. As for alkali halide material 12 besides KBr, it is also possible to use a rock-salt crystal comprising one element selected from water soluble K, Na, and Cs, and one other element selected from Cl, F, Br, and I. Examples of this rock-salt crystal are NaF, NaCl, KCl, KBr, CsBr, Kl, and CsI. Naturally, the capacitance type acceleration sensor related to this invention is not limited to the above-mentioned embodiment, but instead, the above structure serves as a basic form which can be applied in various forms and sizes.

As described above, the capacitance type sensor of this invention comprises an insulating plate having a through-hole in the thickness direction, a conductive thin film disposed on a surface of the insulating plate covering the through-hole, an electrode layer disposed on the other surface of the insulating plate covering at least the through-hole, and a base material which holds the insulating plate together with the electrode layer. As a result, a small and highly accurate capacitance type sensor can be attained which does not require chemical etching, uses a thin conductive thin film, and is useful for a capacitance type pressure sensor, a capacitance type acceleration sensor etc.

In the embodiment of a capacitance type pressure sensor, a thin film diaphragm part is comprised of a through-hole disposed in an insulating plate and a conductive thin film disposed on a surface of the insulating plate. Besides, the through-hole, the conductive thin film, and an electrode layer form a capacitance part. When a difference appears between the internal pressure of the capacitance part and the external pressure of the diaphragm part, the conductive thin film is curved or distorted, and the distance with the electrode part changes, thereby changing capacitance in the capacitance part. By detecting this capacitance change in the capacitance part, the external pressure can be measured based on the internal pressure of the capacitance part. Furthermore, when the conductive thin film is selected to have a thickness of 10 nm or more and 5 μm or less, a micropressure can be measured with high resolution.

In the embodiment of a capacitance type acceleration sensor, the capacitance type acceleration sensor is formed by disposing a dead weight on the conductive thin film on the opposite side to the through-hole. In this way, a thin film diaphragm part is comprised of a through-hole disposed in an insulating plate and a conductive thin film disposed on a surface of the insulating plate. The through-hole, the conductive thin film, and an electrode layer form the capacitance part. When the whole acceleration sensor is accelerated, the dead weight tries to remain in the original position according to the law of inertia. As a result, due to a relative microdisplacement of the dead weight, the conductive thin film comprising the diaphragm part is distorted. This causes the distance between the film and the electrode layer to change, and capacitance in the capacitance part changes as well. By detecting this change in capacitance in the capacitance part, the power working on the dead weight can be measured. Based on the measured power, acceleration is detected.

According to the manufacturing method of this invention, by holding one side of an insulating plate having a through-hole by means of a holding board having a predetermined flatness, and by filling the through-hole from the other side of the insulating plate with a molten alkali halide material, the surface of the alkali halide material filled into the through-hole is smoothed on the side held by the holding board with the same degree of flatness as the holding board. In this state, the insulating plate is removed from the holding board. Next, by depositing a conductive thin film to cover the filled through-hole part and the vicinity thereof, the conductive thin film having the predetermined flatness can be formed easily at the through-hole part. Furthermore, when the alkali halide material is a rock-salt crystal composed of one element selected from the group consisting of K, Na, and Cs, and one element selected from the group consisting of Cl, F, Br, and I, the alkali halide material can be easily dissolved in water, so that the alkali halide does not remain in the through-hole part. In this way, it is possible to dissolve and remove the alkali halide material almost completely. As a result, not only can a diaphragm having optional mechanical characteristics be attained easily and with high accuracy, but capacitance type sensors produced in quantity also show only a small quality difference.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method of manufacturing a capacitance sensor comprising an insulating plate having a through-hole in the thickness direction, a conductive thin film disposed on a top surface of the insulating plate covering the through-hole, an electrode layer disposed on a bottom surface of the insulating plate covering at least the through-hole, and a base material which holds the insulating plate together with the electrode layer, comprising the steps of:

holding the top surface of an insulating plate having a through-hole in the thickness direction by means of a holding board having a predetermined flatness;

filling the through-hole from the bottom surface of the insulating plate with a molten alkali halide material, cooling the alkali halide material, and smoothing the surface of the alkali halide material filled into the through-hole on the side held by the holding board;

removing the insulating plate from the holding board and depositing a conductive thin film to cover the alkali halide material filled into the through-hole and to cover the vicinity thereof;

dissolving and removing the alkali halide material by washing with water; and bonding the other side of the insulating plate to a base material disposed with a conductive surface which serves as a counter electrode.

2. The method of manufacturing a capacitance sensor as in claim 1, wherein said alkali halide material is a rock-salt crystal composed of at least one alkali metal element selected from the group consisting of Na, K, and Cs, and at least one halogen element selected from the group consisting of F, Cl, Br, and I.

3. The method of manufacturing a capacitance sensor as in claim 1, wherein said alkali halide material is at least one salt selected from the group consisting of NaF, NaCl, KCl, KBr, CsBr, KI, and CsI.

4. The method of manufacturing a capacitance sensor as in claim 1, wherein said conductive thin film has a thickness of 10 nm or more and 5 μm or less.

5. The method of manufacturing a capacitance sensor as in claim 1, wherein said electrode layer is formed on the top surface of the base material, and said electrode layer is adhered mechanically to the bottom surface of the insulating plate.

6. The method of manufacturing a capacitance type sensor as in claim 1, wherein said electrode layer is formed on the top surface of the base material, and said electrode layer is adhered to the bottom surface of the insulating plate by an adhesive.

7. The method of manufacturing a capacitance sensor as in claim 1, wherein said capacitance sensor comprises a capacitance pressure sensor.

8. The method of manufacturing a capacitance sensor as in claim 1, wherein said capacitance sensor comprises a capacitance acceleration sensor formed by disposing a dead weight on the conductive thin film on the opposite side to the through-hole.

* * * * *